United States Patent
Simmonds (10) Patent No.: US 10,663,728 B2
(45) Date of Patent: May 26, 2020

(54) RELATING TO DISPLAYS

(71) Applicant: BAE SYSTEMS plc, London (GB)

(72) Inventor: Michael David Simmonds, Rochester-Kent (GB)

(73) Assignee: BAE SYSTEMS plc, London (GB)

(\*) Notice: Subject to any disclaimer, the term of this patent is extended or adjusted under 35 U.S.C. 154(b) by 14 days.

(21) Appl. No.: 15/570,126

(22) PCT Filed: May 4, 2016

(86) PCT No.: PCT/GB2016/051275
§ 371 (c)(1),
(2) Date: Oct. 27, 2017

(87) PCT Pub. No.: WO2016/181108
PCT Pub. Date: Nov. 17, 2016

(65) Prior Publication Data
US 2018/0146188 A1 May 24, 2018

(30) Foreign Application Priority Data

May 8, 2015 (EP) .................................. 15166913
May 8, 2015 (GB) .................................. 1507879.3

(51) Int. Cl.
G06F 1/00 (2006.01)
G02B 27/01 (2006.01)
(Continued)

(52) U.S. Cl.
CPC ....... *G02B 27/0172* (2013.01); *H04N 13/344* (2018.05); *G02B 6/00* (2013.01);
(Continued)

(58) Field of Classification Search
CPC .......................... H04N 13/383; G02B 27/0172
See application file for complete search history.

(56) References Cited

U.S. PATENT DOCUMENTS

| 5,886,822 A | 3/1999 | Spitzer |
| 2012/0147038 A1 | 6/2012 | Perez et al. |

(Continued)

FOREIGN PATENT DOCUMENTS

| JP | 2014192550 A | 1/2014 |
| JP | 2014192550 A | 10/2014 |

(Continued)

OTHER PUBLICATIONS

International Search Report and Written Opinion received for Patent Application No. PCT/GB2016/051275, dated Jul. 28, 2016. 9 pages.

(Continued)

*Primary Examiner* — Michael A Faragalla
(74) *Attorney, Agent, or Firm* — Finch & Maloney PLLC (57) ABSTRACT

A binocular display device comprising two ocular assemblies (1A, 1B) to be worn by a user concurrently with one respective ocular assembly at each eye. Each ocular assembly comprises an outer optical part having a positive optical strength (2A, 2B), an inner optical part (4A, 4B) having a negative optical strength and a transparent slab waveguide display part (3A, 3B) in between them. Substantially collimated display light is output from the waveguide for display, and external light of an external scene is transmitted through the waveguide from the outer optical part for viewing concurrently with the display light. The inner optical part imposes a divergence on the received display light to generate a virtual focal point (f) substantially common to each ocular assembly. In use, an image conveyed by the display light is superimposed on the external scene as a three-dimensional (3D) image when viewed through the binocular display device.

12 Claims, 7 Drawing Sheets

(51) Int. Cl.
*H04N 13/344* (2018.01)
*G02B 6/00* (2006.01)

(52) U.S. Cl.
CPC .................. *G02B 2027/011* (2013.01); *G02B 2027/0127* (2013.01); *G02B 2027/0129* (2013.01); *G02B 2027/0134* (2013.01); *G02B 2027/0178* (2013.01)

(56) References Cited

U.S. PATENT DOCUMENTS

| | | | |
|---|---|---|---|
| 2012/0206452 A1* | 8/2012 | Geisner | G02B 27/017 345/419 |
| 2013/0314793 A1 | 11/2013 | Robbins et al. | |
| 2013/0322810 A1 | 12/2013 | Robbins | |
| 2014/0002492 A1 | 1/2014 | Lamb et al. | |
| 2015/0292871 A1* | 10/2015 | Kaneko | G06T 5/002 348/135 |

FOREIGN PATENT DOCUMENTS

| | | | |
|---|---|---|---|
| WO | 2005024969 A2 | 3/2005 | |
| WO | 2012078410 A1 | 6/2012 | |
| WO | WO 2012/078410 | * 6/2012 | ......... G02B 27/0172 |
| WO | 2013170074 A1 | 11/2013 | |
| WO | WO 2013/170074 | * 11/2013 | ........... H04N 13/383 |
| WO | 2014105654 A1 | 7/2014 | |
| WO | 2015145119 A1 | 10/2015 | |
| WO | 2016181108 A1 | 11/2016 | |

OTHER PUBLICATIONS

GB Intellectual Property Office Search Report under Section 17(5) received for GB Patent Application No. 1507879.3 dated Nov. 9, 2015. 4 pages.

Extended European Search Report, pursuant to Rule 62 EPC, received for EP Patent Application No. 15166913.2 dated Oct. 22, 2015. 6 pages.

International Preliminary Report on Patentability received for Patent Application No. PCT/GB2016/051275, dated Nov. 23, 2017. 8 pages.

Translation of Office Action for Japanese Patent Application No. 2017-557071, dated Jul. 23, 2019, 3 pages.

* cited by examiner

RELATING TO DISPLAYS

FIELD OF THE INVENTION

The invention relates to planar waveguide display devices and three-dimensional (3D) displays.

BACKGROUND

Planar waveguide display devices are often used in head-up displays (HUD) and helmet-mounted displays for allowing image-bearing light to be displayed as part of a luminous display, to be output through a transparent, planar surface towards the eye of the user. The user is able to view an external scene and image-bearing light output through the transparent planar waveguide concurrently. The result is a luminous display that is perceived as superimposed upon the normal external scene. The display may comprise navigational information, or vehicle control information, for example, which a controller of a vehicle (e.g. a pilot) may thereby perceive whilst maintaining sight of the external scene.

However, the display light output by a planar waveguide display is typically inherently collimated and as a result requires the user to focus at infinity to be able to perceive a luminous display clearly. This may be uncomfortable in practice if the external scene demands a different focus. Furthermore, all perceived elements of a typical such luminous display will share the same focus and this can render visual separation or distinction of separate parts of the display difficult.

The present invention aims to provide an improved display device and/or method.

SUMMARY OF THE INVENTION

In a first aspect, the invention provides a binocular display device comprising two ocular assemblies to be worn by a user concurrently with one respective ocular assembly at each eye, wherein each ocular assembly comprises:

an outer optical part having a positive optical strength arranged for receiving external light from an external scene and for directing the result to a transparent planar waveguide display part of the device; and, the transparent waveguide display part is arranged for outputting through a planar surface thereof substantially collimated display light guided thereto by the waveguide display part for display, and for transmitting through the planar surface the external light directed thereto from an outer optical part for viewing concurrently with the display light; and, an inner optical part having a negative optical strength arranged for receiving both the external light and the substantially collimated display light from the waveguide display part, and for imposing a divergence on the received display light to generate a virtual focal point substantially common to each ocular assembly, and outputting the result for display.

In use, an image conveyed by the display light is superimposed on the external scene as a three-dimensional (3D) image when viewed through the binocular display device. The divergence imposed upon the received display light is most preferably not imposed upon the external light received thereby. Most preferably, the received external light is output by the inner optical part substantially in the same state of collimation (or convergence, or divergence as the case may be) as existed in respect of that external light as it was received by the outer optical part. The binocular display device may be configured to applying a parallax to a character, object or symbol within an image conveyed by the image bearing light applied through the two planar waveguide displays of the two ocular assemblies. The parallax may be achieved by applying an offset or position shift to the character, object or symbol relative to the respective frames of the waveguide displays. The direction of the respective offset or shift, as between the two frames, may be relatively opposite directions—e.g. to increase relative separations. The device may be configured to adjust the applied parallax according to the focal depth associated with the virtual focal point, such that the former is consistent with the latter to permit 3D viewing of the character, object or symbol.

The magnitude of the optical strength of the outer optical part preferably is substantially equal to the magnitude of the optical strength of the inner optical part. Thus, such distortions of the external scene caused by the former may be partially, or substantially fully removed by the latter.

The inner and/or outer optical part preferably comprises a lens.

Most preferably, the inner and outer optical parts are optically conjugated, e.g. they may comprise a pair of conjugate lenses, or other optical elements. This means that the optical effect upon external light imposed by the outer lens may be substantially reversed/negated by the effect of the inner lens, such that the external scene remains substantially apparently unaltered by the presence of the inner lens. For example, a pre-convergence may be applied by the outer lens such that the subsequent divergence imposed by the inner lens returns the external light substantially to its initial state.

The result is that the divergence of the inner lens is only visible in respect of the display light, which may be brought to a virtual focus as a result. The virtual focal point is preferably substantially common to each ocular assembly. As a consequence, parallax (binocular disparity) is imposed on the display light as perceived by a user and the display information/image may be seen to reside in 3D superposition upon the normal external scene. The depth of the 3D superposition may be selected by selecting the virtual focal point appropriately.

The inner (and/or outer) optical part may be of controllably variable optical strength for this purpose. The device may comprise a controller arranged to control the optical strength of the inner optical parts of each ocular assembly such that the virtual focal point substantially common to each ocular assembly.

In a second aspect, the invention may provide a Head-Up Display (HUD) comprising a binocular display described above. In a third aspect, the invention may provide a helmet-mounted display comprising a binocular display described above.

In a fourth aspect, the invention may provide a method of three-dimensional (3D) display comprising:

providing a binocular display device comprising two ocular assemblies to be worn by a user concurrently with one respective ocular assembly at each eye, and with each ocular assembly concurrently;

outputting substantially collimated display light from an output surface of a transparent optical planar waveguide display;

passing the collimated display light through an inner optical part of negative optical power thereby to impose a divergence on the display light for viewing;

passing external light from an external scene through an outer optical part having a positive optical strength and directing the result through the output surface and subsequently through the inner optical part;

whereby the divergence imposed on the display light generates a virtual focal point substantially common to each ocular assembly such that an image conveyed by the display light is viewed as superimposed on the external scene as a three-dimensional (3D) image when viewed through the binocular display device.

The magnitude of the optical strength of the outer optical part is preferably substantially equal to the magnitude of the optical strength of the inner optical part, such that distortions of the external scene caused by the former are substantially removed by the latter.

The method may include controlling/varying the optical strength of the inner optical parts of each ocular assembly such that the virtual focal point substantially common to each ocular assembly. The method may include applying a parallax to a character, object or symbol within an image conveyed by the image bearing light applied through the two planar waveguide displays of the two ocular assemblies. The parallax may be achieved by applying an offset or position shift to the character, object or symbol relative to the respective frames of the waveguide displays. The direction of the respective offset or shift, as between the two frames, may be relatively opposite directions—e.g. to increase relative separations. The method may include adjusting the applied parallax according to the focal depth associated with the virtual focal point, such that the former is consistent with the latter to permit 3D viewing of the character, object or symbol.

DETAILED DESCRIPTION

Figure 1:
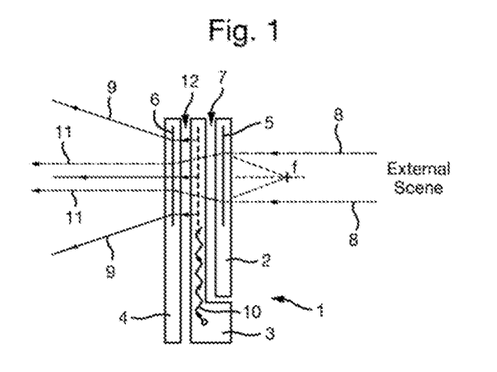
FIG. 1 shows a schematic diagram of one of two ocular assemblies of a binocular display device.
Figure 2:
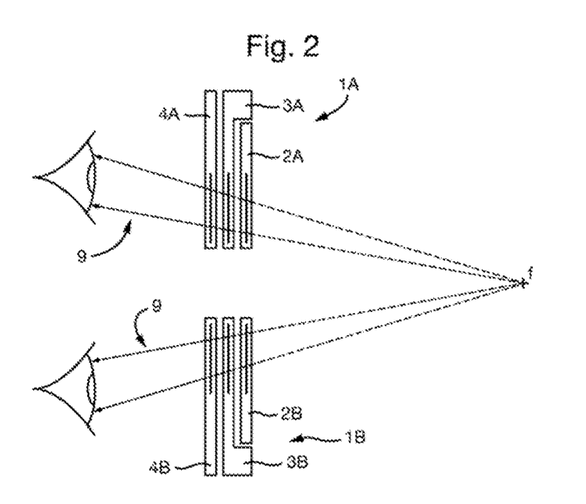
FIG. 2 shows a schematic diagram of a binocular display device comprising two ocular assemblies according to FIG. 1.

FIG. 1 shows a cross-sectional schematic view of one ocular assembly 1 of two such ocular assemblies (1A, 1B) of a binocular display device of FIG. 2 to be worn by a user concurrently with one respective ocular assembly at each eye.

The ocular assembly comprises an outer optical part 2 containing a converging lens 5 of optical power +X dioptres (e.g. X=1). The converging lens is arranged to receive external light 8 from an external scene and for directing the external light, slightly more converging (or less diverging) than originally, towards a transparent planar waveguide display part 3 of the ocular.

The transparent and generally planar, slab waveguide display part 3 is arranged for receiving image/information-carrying light 10 from a display light source (not shown). The display light is injected into the slab waveguide, typically by a process of diffraction at an input diffraction grating (not shown) of the waveguide. The injected display light is thereafter internally guided by a process of total internal reflection (TIR) along the slab waveguide towards an output diffraction grating area 7 formed within/upon the body of the waveguide. The output diffraction grating extends over an area of the waveguide parallel to the planar surface of the slab waveguide and serves to diffract out through the planar surface of the slab, at least some of the display light that has been guided to it by TIR.

The output display light 12, emanating through the planar output area at the surface of the slab waveguide, is substantially collimated. This is a property of slab waveguides generally. The structure and function of the slab waveguide is in accordance with known slab waveguides, which are readily available and understood by the skilled person.

The output area of the slab waveguide is arranged in register with the converging lens of the outer optical part such that the external light directed to the slab waveguide from the converging lens 5 is combined with display light output from the output area of the slab waveguide in the same direction for viewing concurrently. The transparency of the output area of the slab waveguide means that output display light 12 and transmitted external light 8, from an external scene, are combined for viewing concurrently at the side of the slab waveguide opposite to the side facing the outer optical part.

Indeed, at the side of the slab waveguide opposite to the side facing the outer optical part, there is positioned an inner optical part 4 containing a diverging lens 6 of optical power −X dioptres (e.g. X=−1). This diverging lens is arranged in register with the output area of the slab waveguide for receiving both the external light 8 and the collimated display light 12 output from the display area of the slab waveguide. The diverging lens 6 imposes a divergence on the collimated display light to generate a virtual focal point ("f"). However, because the power of the diverging lens 6 negates the power of the converging lens 5, and only external light has been through both lenses (display light has passed through only the diverging lens 6), any distortion/effect upon the external scene caused by the converging lens 5 is reversed by the action of the subsequent diverging lens. The result is that the external scene is viewed as unaffected by the presence of the diverging lens 6 through which the external light must pass concurrently with the display light in order that the display light can be brought to a virtual focus.

Both of the two ocular assemblies (1A, 1B) of operate in this manner, one at each eye of the wearer (FIG. 2). In use, an image conveyed by the display light is superimposed on the external scene as a three-dimensional (3D) image when viewed through the binocular display device.

The divergence of the converging lens 6 of each of a left-eye/right-eye pair of these ocular assemblies (4A, 4B) is only visible in respect of the display light, which is brought to a virtual focus by each ocular assembly as a result. The virtual focal point ("f") is common to each ocular assembly. As a consequence, parallax (binocular disparity) is imposed on the display light as perceived by a user and the display information/image may be seen to reside in 3D superposition upon the normal external scene. The depth of the 3D superposition may be selected by selecting the virtual focal point appropriately.

The optical power of the diverging lenses of each of the two inner (4A, 4B) optical assemblies is controllably variable to cause each to reach the same virtual focal point. The device comprises a controller unit arranged to control the optical strength of the two diverging lenses such that the virtual focal point remains substantially common to each ocular assembly, and such that it may vary in position.

Fixed lenses or adjustable lenses, such as are well known to the skilled person and readily available, may be employed for either one or both of inner and/or outer optical parts.

Three possible structures for the diverging-converging lenses (or combinations thereof) may include, but are not limited to: spherical/aspheric lenses; Fresnel lenses; Zone plates (or diffractive elements). Lenses may be made variable, for example, by changing the lens curvature or refractive index (classic lens, Fresnel lens) by mechanical means or electrically. Regarding zone plates, this structure may be achieved by varying the diffractive pattern on the elements. For each focal position, the converging-diverging lens pair may most preferably be conjugate to give substantially no net optical effect/distortion to the image from the external scene as viewed by the user.

Either of two existing methods may be employed to achieve variable focal length in each ocular assembly: electro-optically and/or opto-mechanically.

Electro-optical methods may use liquid crystals as the active medium by applying an electric voltage to the liquid crystal to change the refraction of the liquid crystal. Liquid crystal lenses are readily available that can be electronically adjusted in terms of optical power and focal length. Examples are described in:

[1] Guoquiang Li, et al. *Applied Physics Letters,* 89, 141120 (2006);
[2] Guoquiang Li, et al. *Procs. of the National Academy of Sciences,* vo. 103, no. 16, 6100-6104, (2006);
[3] Guoquiang Li, et al. *Applied Physics Letters,* 90, 111105 (2007);
[4] Pouria Valley et al. *OPTICS LETTERS,* Vol. 35, No. 3, 336 (2010);
[5] Pouria Valley et al. *OPTICS LETTERS,* Vol. 35, No. 15, 2528 (2010).

Figure 7:
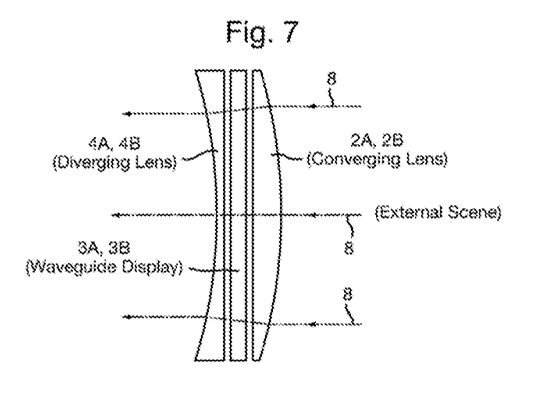
FIGS. 7, 8 and 9 show examples of combinations of optical elements suitable for providing an ocular assembly.
Figure 8:
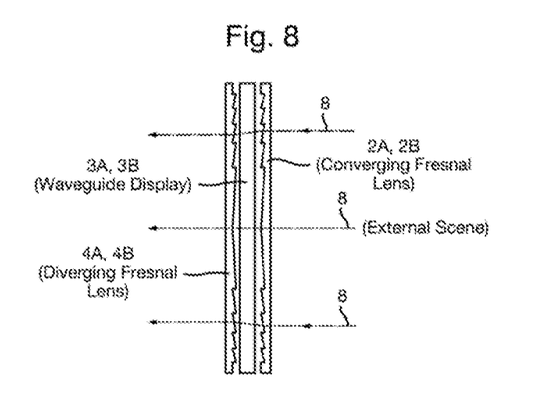
Figure 9:
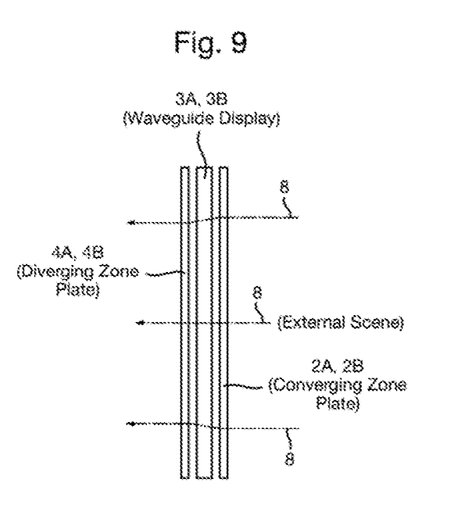

Opto-mechanical arrangements may allow focus control by the wearer via movement of a small slider which may be located on the device (e.g. on a bridge between the pair of ocular assemblies). The user may adjust the lenses in each ocular assembly for optical clarity and virtual focal point at the desired distance. Such a mechanical arrangement may comprise a combination of rigid and flexible lenses that can change prescription to enable sharp focus at different distances. The mechanism, actuated by the slider, may simultaneously control both flexible lenses to assure appropriate near vision tracking in both eyes. Two conventional lens elements may be combined into a single element such that adjusting the mechanical alignment (e.g. separation adjustment, via a slider as described above) between them adjusts the optical power of the pair. The conventional lenses may be mechanically adjusted either by hand or by a small motor mechanically coupled to a frame supporting the lenses in a slider mechanism such as is commonly used in known motor-actuated lens control mechanisms. FIGS. 7, 8 and 9 show examples of combinations of optical elements suitable for providing an ocular assembly. For example, as shown in FIG. 7, an ocular assembly may comprise a slab waveguide display sandwiched between a converging outer lens (e.g. plano-convex) and a diverging inner lens (e.g. plane-concave). For example, as shown in FIG. 8, an ocular assembly may comprise a slab waveguide display sandwiched between a converging outer Fresnel lens and a diverging inner Fresnel lens. For example, as shown in FIG. 9, an ocular assembly may comprise a slab waveguide display sandwiched between a converging outer zone plate and a diverging inner zone plate. Relative movement of the inner and outer lenses/plates of these assemblies, along their mutual optical axes, may control the optical powers of the oculars.

Figure 3:
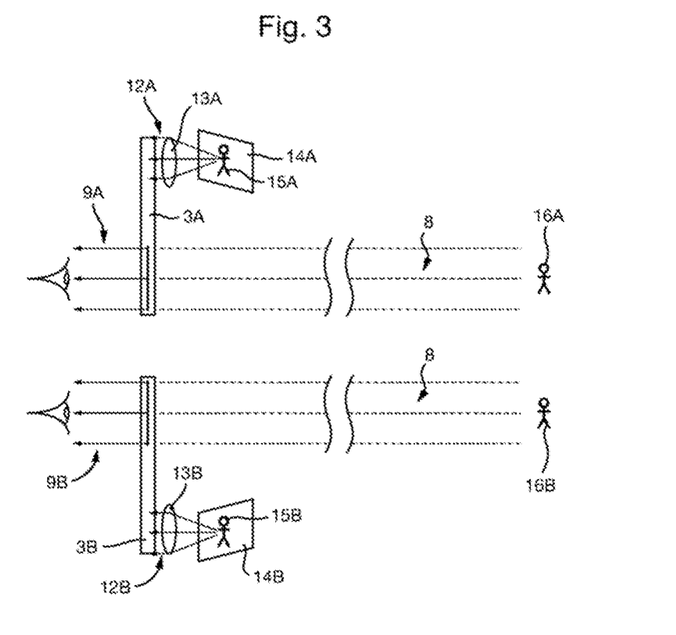
FIGS. 3 to 5 show a series of schematic diagrams of a binocular display device illustrating the principle underlying the operation of the apparatus illustrated in FIG. 2.
Figure 4:
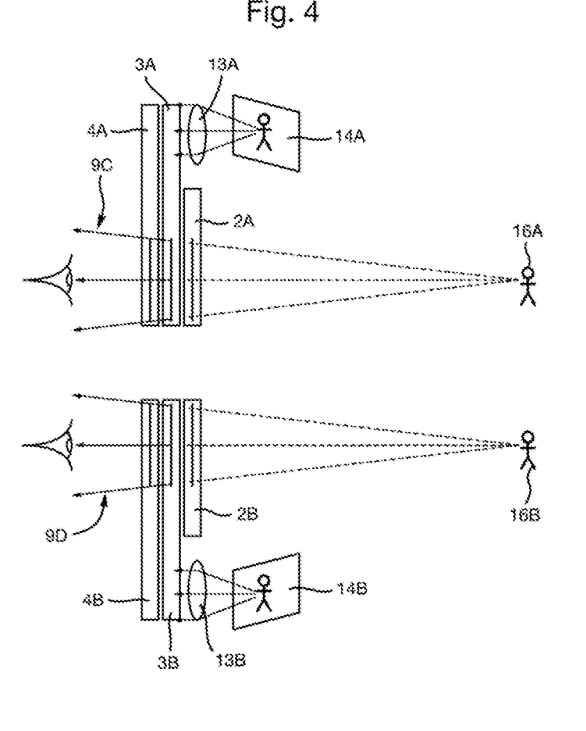
Figure 5:
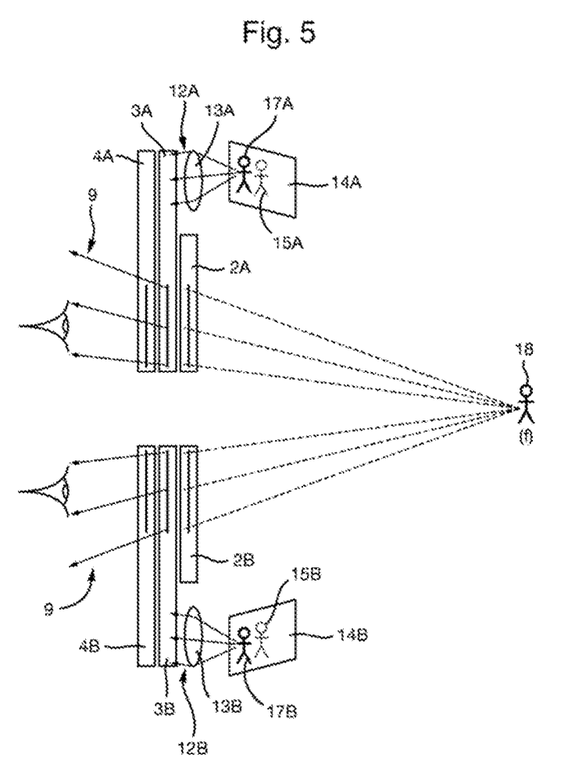

FIGS. 3 to 5 schematically show the principle underlying the operation of the apparatus illustrated in FIG. 2. As is shown schematically in FIG. 3, image-bearing light (12A, 12B) bearing a display image (14A, 14B) including a character (15A, 15B) when input into slab waveguides (3A, 3B) by collimating input optics (e.g. converging lens 13A, 13B) is subsequently output at the output region of each slab waveguide as collimated output light (9A, 9B). Thus, the collimated waveguide display-light output provides the user with an image (16A, 16B) in each eye that is substantially collimated and contains no parallax, such that the picture being displayed appears at optical infinity. This image is viewed concurrently with ambient light from an external scene 8, through the transparent slab waveguide output parts.

FIG. 4 schematically shows the optical effect of introducing the converging outer optical parts (2A, 2B) and diverging inner optical parts (4A, 4B) upon the image-bearing display light (9C, 9D) and the focal depth of the resulting viewed images (16A, 16B) produced by the apparatus. In particular, each of the images output by the two slab waveguides, respectively, now possesses a finite focal depth (the same depth, substantially) and the image-bearing light is no longer collimated, but is diverging at the eyes of the user thereby to permit a virtual image (16A,16B) of the displayed image character to be formed. Thus, when the variable lenses are added the apparatus enables the display to focus closer to the user. The focal depth of each display image is controllable by controlling the optical power of the respective variable lenses.

In order to provide the displays with a suitable parallax, to make the display appear closer, in conjunction with adding the appropriate optical power to the variable lenses an amount of binocular parallax may be added to force the display to appear at the desired focal distance. FIG. 5 schematically shows how this may be achieved according to an embodiment of the invention. In particular, by applying a suitable shift in the positions of the character/object (15A, 15B) on each display device (14A, 14B) to a new character/object position (17A, 17B) one may in add the required amount of parallax, in combination with an associated lens power, to force the picture (18) viewed through each eye of the user to converge at a common respective virtual focal point (f) and thereby to appear at the correct focal position (f) as shown in FIG. 5. In particular, it is to be noted that the respective central axes of symmetry of each cone of diverging image-bearing light (9C, 9D) conveying the image character (15A, 15B) as output by the oculars of the apparatus of FIG. 4, prior to application of image character shift (parallax) are substantially mutually parallel. The application of a character shift renders the axes of those light cones (9, FIG. 5) non-parallel and diverging in the direction towards the viewer, thereby to apply a parallax effect.

Figure 6:
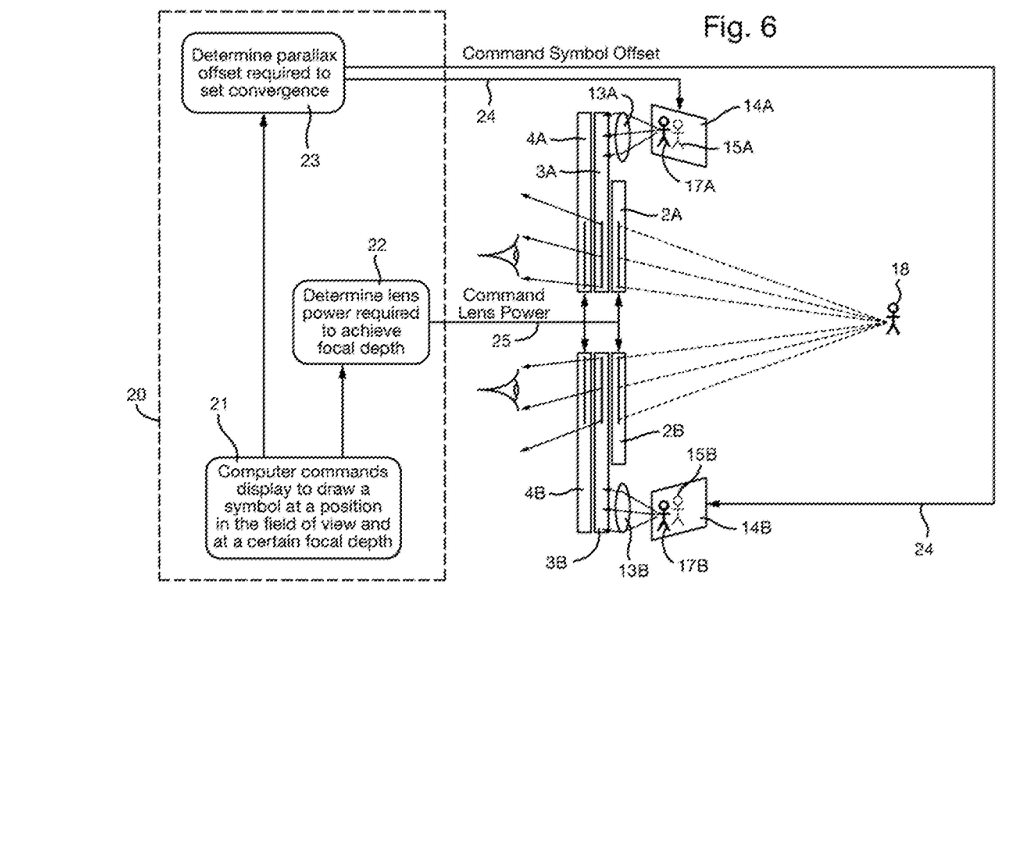
FIG. 6 schematically illustrates the system of FIG. 2 in more detail.

FIG. 6 schematically illustrates the system of FIG. 2 in more detail and including a control unit 20 configured to apply the above parallax effect. The control unit comprises a computer including a command unit 21, a lens power control unit 22, and a parallax control unit 23. The command unit is configured to receive an external control signal (not shown) either from the user via a command input interface (not shown) or from a separate control system/computer (not shown) such as may be provided in an aircraft or other vehicle. The external control signal contains a command to cause a display character, object or symbol to be displayed by the display units (14A, 14B) of the system to implement viewing at a specified position and focal depth within the field of view of the user.

The command unit is configured to be responsive to such a control signal to control the display unit (14A, 14B) of each of the two oculars of the apparatus, to generate an image character, object or symbol at the necessary respective position in the display field of each display unit, and to control the variable lenses (2A, 4A; 2B, 4B) of each of the two oculars to control their optical power to obtain the desired focal depth (f). The parallax control unit 23 is configured to calculate the required image character shift and to issue a symbol offset command 24 to each image display (14A, 14B), and the lens power control unit is configured to calculate the required lens power and to issue a lens power adjustment command 25 for achieving adjustments of the optical power of the lenses of each ocular. The symbol offset command is determined according to the desired focal depth value since successful parallax effect is dependent upon the focal depth employed in an image.

The above embodiments are intended to illustrate non-limiting examples of suitable implementations of the invention. However, it is to be understood that other examples, embodiments and implementations are envisaged within the scope of the invention such as is defined by the claims which follow, as would be readily apparent to the skilled person reading the present disclosure.

The invention claimed is:

1. A binocular display device comprising two ocular assemblies to be worn by a user concurrently with one respective ocular assembly at each eye, wherein each ocular assembly comprises:
    an outer optical part having a positive optical strength arranged for receiving external light from an external scene and for directing the result to a transparent planar waveguide display part of the device,
    said transparent planar waveguide display part is configured to receive image-bearing light bearing a same display image including a character, an object, or a symbol, output through a planar surface thereof substantially collimated display image-bearing light guided thereto by the waveguide display part for display, and transmit through the planar surface the external light directed thereto from the outer optical part for viewing concurrently with said display image-bearing light; and
    an inner optical part having a negative optical strength arranged for receiving both the external light and the substantially collimated display image-bearing light from the waveguide display part, and for imposing a divergence on the received display image-bearing light to generate a virtual focal point substantially common to each ocular assembly, and outputting the result for display,
    wherein a parallax of viewing the same display image by both eyes via the two ocular assemblies is adjusted by applying, to each ocular assembly, a shift in a position of the display image-bearing light bearing the character, the object, or the symbol relative to a display field of each respective ocular assembly to a new non-parallel and optically divergent position independently of the external light based on a focal depth associated with the virtual focal point,
    whereby, in use, the same display image conveyed by the display image-bearing light is superimposed on the external scene as a three-dimensional (3D) image when viewed through the binocular display device.

2. The binocular display device according to claim 1, wherein a magnitude of the optical strength of the outer optical part is substantially equal to a magnitude of the optical strength of the inner optical part, such that distortions of the external scene caused by the former are substantially removed by the latter.

3. The binocular display device according to claim 1, wherein the outer optical part includes a lens.

4. The binocular display device according to claim 1, wherein the inner optical part includes a lens.

5. The binocular display device according to claim 1, wherein the inner optical part and the outer optical part each include a pair of conjugated lenses.

6. The binocular display device according to claim 1, wherein at least one of the inner optical part and the outer optical part has a controllably variable optical strength.

7. The binocular display device according to claim 6, comprising a controller arranged to control the optical strength of at least one of the inner optical part and the outer optical part of each ocular assembly such that the virtual focal point is substantially common to each ocular assembly.

8. A Head Up Display (HUD) comprising a binocular display according to claim 1.

9. A Helmet-mounted display comprising a binocular display according to claim 1.

10. A method of three-dimensional (3D) display using a binocular display device comprising two ocular assemblies to be worn by a user concurrently with one respective ocular assembly at each eye, and with each ocular assembly concurrently, the method comprising:
    outputting, through a planar surface of a transparent waveguide display, substantially collimated display image-bearing light, the waveguide display configured to receive the image-bearing light bearing a same display image including a character, an object, or a symbol;
    passing the collimated display image-bearing light through an inner optical part having a negative optical strength thereby to impose a divergence on the display image-bearing light for viewing;
    passing external light from an external scene through an outer optical part having a positive optical strength and directing the result through said output surface and subsequently through said inner optical part; and
    adjusting a parallax of viewing the same display image by both eyes via the two ocular assemblies by applying, to each ocular assembly, a shift in a position of the display image-bearing light bearing the character, the object, or the symbol relative to a display field of each respective ocular assembly to a new non-parallel and optically divergent position independently of the external light based on a focal depth associated with a virtual focal point;
    whereby said divergence imposed on the display image-bearing light generates the virtual focal point substantially common to each ocular assembly such that an image conveyed by the display light is viewed as superimposed on the external scene as a three-dimensional (3D) image when viewed through the binocular display device.

11. The method according to claim 10, wherein a magnitude of the optical strength of the outer optical part is substantially equal to a magnitude of the optical strength of the inner optical part, such that distortions of the external scene caused by the former are substantially removed by the latter.

12. The method according to claim 10, including varying the optical strength of the inner optical parts of each ocular assembly such that the virtual focal point substantially common to each ocular assembly.

* * * * *